(12) United States Patent
Ozkaragoz et al.

(10) Patent No.: US 7,890,330 B2
(45) Date of Patent: Feb. 15, 2011

(54) VOICE RECORDING TOOL FOR CREATING DATABASE USED IN TEXT TO SPEECH SYNTHESIS SYSTEM

(75) Inventors: Inci Ozkaragoz, Torrance, CA (US); Benjamin Ao, Torrance, CA (US); William Arthur, San Juan Capistrano, CA (US)

(73) Assignee: Alpine Electronics Inc., Tokyo (JP)

( * ) Notice: Subject to any disclaimer, the term of this patent is extended or adjusted under 35 U.S.C. 154(b) by 1055 days.

(21) Appl. No.: 11/647,825

(22) Filed: Dec. 30, 2006

(65) Prior Publication Data

US 2007/0203704 A1 Aug. 30, 2007

Related U.S. Application Data

(60) Provisional application No. 60/755,407, filed on Dec. 30, 2005.

(51) Int. Cl.
 *G10L 13/06* (2006.01)
(52) U.S. Cl. .................. 704/266; 704/257; 704/9; 704/255; 704/258; 434/169; 434/156; 434/178; 455/168.1
(58) Field of Classification Search .......... 704/260, 704/257, 9, 251, 255, 270, 275, 258, 2, 8, 704/266, 273; 434/169, 156, 178; 455/168.1; 348/468; 715/236, 250, 258, 210, 234; 707/999.006, 707/999.004
See application file for complete search history.

(56) References Cited

U.S. PATENT DOCUMENTS

| | | | | |
|---|---|---|---|---|
| 4,769,844 | A * | 9/1988 | Fujimoto et al. ............ | 704/248 |
| 4,799,261 | A * | 1/1989 | Lin et al. .................... | 704/219 |
| 5,860,064 | A | 1/1999 | Henton | |
| 6,038,533 | A * | 3/2000 | Buchsbaum et al. ........ | 704/260 |
| 6,236,365 | B1 * | 5/2001 | LeBlanc et al. ............ | 342/457 |
| 6,598,018 | B1 * | 7/2003 | Junqua ....................... | 704/251 |
| 6,792,407 | B2 * | 9/2004 | Kibre et al. ................. | 704/260 |
| 6,813,604 | B1 * | 11/2004 | Shih et al. ................... | 704/260 |
| 6,952,181 | B2 * | 10/2005 | Karr et al. ................... | 342/457 |
| 6,970,915 | B1 | 11/2005 | Partovi et al. | |
| 7,010,488 | B2 * | 3/2006 | van Santen et al. ......... | 704/258 |
| 7,010,489 | B1 * | 3/2006 | Lewis et al. ................. | 704/260 |
| 7,013,278 | B1 * | 3/2006 | Conkie ....................... | 704/260 |
| 7,092,514 | B2 * | 8/2006 | Trump et al. ........... | 379/390.03 |
| 7,421,321 | B2 * | 9/2008 | Breed et al. .................. | 701/29 |
| 7,529,675 | B2 * | 5/2009 | Maes ....................... | 704/270.1 |
| 2002/0184373 | A1 * | 12/2002 | Maes ......................... | 709/228 |
| 2002/0193994 | A1 * | 12/2002 | Kibre et al. ................. | 704/260 |
| 2003/0216920 | A1 * | 11/2003 | Bao ........................... | 704/260 |
| 2004/0054536 | A1 * | 3/2004 | Kuo et al. ................... | 704/260 |
| 2005/0060151 | A1 * | 3/2005 | Kuo et al. ................... | 704/240 |
| 2010/0094632 | A1 * | 4/2010 | Davis et al. ................. | 704/260 |

* cited by examiner

*Primary Examiner*—Vijay B Chawan
(74) *Attorney, Agent, or Firm*—Muramatsu & Associates (57) ABSTRACT

A method records verbal expressions of a person for use in a vehicle navigation system. The vehicle navigation system has a database including a map and text describing street names and points of interest of the map. The method includes the steps of obtaining from the database text of a word having at least one syllable, analyzing the syllable with a greedy algorithm to construct at least one text phrase comprising each syllable, such that the number of phrases is substantially minimized, converting the text phrase to at least one corresponding phonetic symbol phrase, displaying to the person the phonetic symbol phrase, the person verbally expressing each phrase of the phonetic symbol phrase, and recording the verbal expression of each phrase of the phonetic symbol phrase.

16 Claims, 4 Drawing Sheets

VOICE RECORDING TOOL FOR CREATING DATABASE USED IN TEXT TO SPEECH SYNTHESIS SYSTEM

This application claims the benefit of U.S. Provisional Patent Applications Ser. No. 60/755,407 filed Dec. 30, 2005, entitled "VOICE RECORDING TOOL FOR CREATING DATABASE USED IN TEXT TO SPEECH SYNTHESIS SYSTEM" by Ozkaragoz, et al., which is hereby incorporated by reference herein for all purposes.

FIELD OF THE INVENTION

The technology disclosed by this application is related to a text to speech synthesis system. More specifically, embodiments are directed to a method of analyzing voice recordings for creating a database used for a text to speech synthesis system.

BACKGROUND ART

Text-to-speech synthesis technology gives machines the ability to convert arbitrary text into audible speech, with the goal of being able to provide textual information to people via voice messages. Key target text to speech synthesis applications in communications include: voice rendering of text-based messages such as email or fax as part of a unified messaging solution, as well as voice rendering of visual/text information (e.g., web pages). In the more general case, text to speech synthesis systems provide voice output for all kinds of information stored in databases (e.g., phone numbers, addresses, vehicle navigation information) and information services (e.g., restaurant locations and menus, movie guides, etc.). Ultimately, given an acceptable level of speech quality, text to speech synthesis systems could also be used for reading books (i.e., Talking Books) and for voice access to large information stores such as encyclopedias, reference books, law volumes, etc.

In certain applications such as mobile or portable devices, the text-to-speech systems have been limited by both the processing power and data storage capacity of the devices. As such, a need exists for text to speech device and/or method which provides an acceptable level while minimizing the processing and data storage needed.

SUMMARY OF THE INVENTION

In embodiments the present invention includes a method for recording verbal expressions of a person for use in a vehicle navigation system. The vehicle navigation system has a database including a map and text describing street names and points of interest of the map. The method includes the steps of obtaining from the database text of a word having at least one syllable, analyzing the at least one syllable with a greedy algorithm to construct at least one text phrase comprising each syllable of the at least one syllable, such that the number of phrases is at least substantially minimized, converting the at least one text phrase to at least one corresponding phonetic symbol phrase, displaying to the person the at least one phonetic symbol phrase, the person verbally expressing each phrase of the at least one phonetic symbol phrase, and recording the verbal expression of each phrase of the at least one phonetic symbol phrase.

Depending on the embodiment, many alternate aspects of the method can exist. For instance, the text of the word having at least one syllable can describe either a street name and/or a point of interest.

The method can further include a step of comparing an amplitude of the recorded verbal expression to a predefined amplitude range to determine if the amplitude is within the predefined amplitude range. When the amplitude is within the predefined amplitude range, then the method can further include a step of storing in a verbal expression database the recorded verbal expression. However, when the amplitude of the recorded verbal expression is outside of the predefined amplitude range, then the steps of displaying to the person the at least one phonetic symbol phrase, the person verbally expressing each phrase of the at least one phonetic symbol phrase, and recording the verbal expression of each phrase of the at least one phonetic symbol phrase, are repeated.

In other embodiments, the method can also include a step of recording a first blank period, wherein the first blank period is substantially silent, as well as a step of recording a second blank period, wherein the second blank period is substantially silent. Where in some embodiments the duration of the first blank period and the second blank period are each at least one millisecond in duration. The recording the first blank period can occur prior to the step of recording the verbal expression of each phrase and the recording the second blank period can occur after the step of recording the verbal expression of each phrase.

The method in some cases can include a step of indexing the recording of the verbal expression to a description of the recording and storing the indexed recording of the verbal expression in a verbal expression database.

The description of the recording can be the text and/or the phonetic symbol of each phrase of the verbal expression.

DETAILED DESCRIPTION OF THE INVENTION

The text to speech synthesis system of the present invention incorporates a database which stores syllables and supersyllables as well as sound units created by a voice recording tool and a voice analysis tool. This application also discloses the features involved in the database for storing the syllables and sound units, the voice recording tool for recording speech sounds produced by a voice talent, and the voice analysis tool for marking-up and analyzing syllables in the phrases recorded by the voice recording tool.

A text to speech synthesis system in the conventional technology utilizes diphones, semi diphones, and phonemes as concatenative units. In contrast, one of the essential features of the text to speech synthesis system that has been developed by the inventors of this application resides in the fact the syllable and supersyllable are used as concatenative units. Syllables are combinations of phonemes.

A text to speech synthesis system using the phoneme as the concatenative unit tends to involve acoustic mismatches between vowels and consonants within the syllable. For example, it could concatenate the two phonemes "b" and "u" to produce the word "boo". However, unless specifically designed not to do so, it could conceivably concatenate with "b" a vowel "u" that originally was recorded with a preceding "d". Since the second formant of the naturally produced "bu" is very different from the second formant of the naturally produced "du", the synthesized output of "bu" would not sound exactly like the original naturally produced "bu". The text to speech synthesis system of the present invention avoids this problem since the system uses the syllable as the concatenative unit. The text to speech synthesis system would produce the synthesized syllable "bu" just as it was recorded since it was never split into phonemes. Consequently, it is possible to avoid mismatches within syllables.

The concatenative unit which is used in the present invention text to speech (TTS) synthesis system is based on a syllable-in-context construct. Since any English word can be split into syllables consisting of a vowel nucleus and adjacent consonants, the notion of the syllable as the basic concatenative unit has advantages. One of the greatest advantages of making the syllable the basic concatenative unit is that the acoustic characteristics of most consonant-vowel transitions are preserved. That is, context-conditioned acoustic changes to consonants are automatically present to a great extent when the syllable is chosen as the basic unit. However, due to the fact that the syllable inventory for English is very large and sufficient computational storage and processing capabilities must be available.

Although using the syllable as the basic concatenative unit reduces the number of acoustic mismatches between vowels and consonants within the syllable, it does not address the problem of treating coarticulation mismatches across syllable boundaries. This type of syllable boundary coarticulation can be just as important as within syllable coarticulation.

Here, the syllable coarticulation means as follows. For example, individual sounds like "b" "a" and "t" are encoded or squashed together into the syllable-sized unit "bat". When a speaker produces this syllable, his vocal tract starts in the shape characteristic of a "b". However, the speaker does not maintain this articulatory configuration, but instead moves his tongue, lips, etc. towards the positions that would be attained to produce the sound of "a". The speaker never fully attains these positions because he starts towards the articulatory configuration characteristic of "t" before he reaches the steady state (isolated or sustained) "a" vowel. The articulatory gestures that would be characteristic of each isolated sound are never attained. Instead the articulatory gestures are melded together into a composite, characteristic of the syllable. There is no way of separating with absolute certainty the "b" articulatory gestures from the "a" gestures. Consequently, the "b" and the "a" are said to be coarticulated.

Syllable-in-context Synthesis

Due to the problem of syllable boundary coarticulation stated above, the TTS synthesis System of embodiments of the present invention has stored in its TTS database every possible English syllable, and if the syllable is bounded by a vowel on at least one side, its possible linguistic context is encoded as well. Because of storage limitations, providing the linguistic context for each syllable is limited to syllables whose boundaries consisted of vowels, but not consonants. This is because, relatively speaking, more linguistic coloring occurs across vocalic boundaries than across consonantal boundaries. For example, the syllable "ba" would have linguistic context encoded for the vowel "a", but not for the consonant "b". The syllable-in-context construct of using the English syllable as the basic concatenative unit along with its very large inventory of linguistic context provides for a smooth synthetic output. The syllable context information is encoded for syllables beginning or ending with a vowel.

Supersyllables

As mentioned above, due to storage limitations, in embodiments only syllables with vocalic boundaries could have their linguistic context recorded and stored in a TTS database. This leaves open the possibility of coarticulation mismatches across consonantal syllabic boundaries. This is one reason why the concept of the supersyllable was created; it allows certain syllables to include more than one vowel nucleus when the syllables involve consonants that are particularly prone to coloring their adjacent linguistic context. For example, when the consonant "r" is crucially followed by an unstressed vowel, as in "terrace" shown below, the concatenative unit then includes both vowels on which the "r" hinges. Since two vowel nuclei are included in this concatenative unit, it's referred to as a supersyllable and is not divisible within the system. (Note: Unstressed vowels are indicated by the tilde ~. The phrasal stress is indicated by the asterisk *.)

e.g. TERRACE tE*rx~s}

Another example of a supersyllable is if two vowels appear consecutively and one is unstressed as in "spi~a*" shown below. Typically, the unit would be split into two syllables. The decision to classify two consecutive vowels, in which one is unstressed, into a supersyllable is that there is heavy linguistic coloring between the two vowels; as such there is no exact dividing line between the vowels acoustically.

e.g. CASPIANA ka'|spi~a*|nx~}

VCV Structures

Since there is no objective criteria for assigning consonants to a particular vowel nucleus in certain ambiguous cases such as "letter", embodiments of the TTS synthesis system of the present invention delineates VCV structures into V|CV. Thus, "letter" for example would be phonetically divided into "le" and "tter", rather than "lett" and "er", in such embodiments of the system.

Because embodiments of the TTS synthesis system of the present invention use the syllable and supersyllable as the concatenative units, the system can avoid coarticulation mismatches across syllable boundaries as noted above. When syllables are concatenated with other syllables, the linguistic context of the syllables (if ending or starting with a vowel) is taken into account in order to avoid mismatches across the syllable boundaries. For example, when a syllable "pA*" is concatenated with a following syllable that starts with a "p", as in POPLUAR pA*|plu~A~r], the syllable "pA*" must be selected from a class of "pA*" that all were followed by a "p" in the original recording. Similarly, the syllable "pA*" that is selected to synthesize the word PASTA pA*|stx~] must be selected from a class of "pA*" syllables that were originally followed by an "s". That is, the original linguistic context for "pA*" must be considered when synthesizing it with other syllables.

Phonetic Symbol Set and Phrase List

As described above, the concatenative unit in embodiments of the TTS synthesis system of the present invention is the syllable-in-context. The TTS synthesis system stores in its TTS database every possible English syllable, and if the syllable is bounded by a vowel on at least one side, its possible linguistic context is encoded as well.

Before a recording list of phrases comprising every English syllable with its phonetic transcription could be created, a phonetic symbols set has to be selected for use. The Applicants have created unique phonetic symbols set. Most of prior phonetic transcription systems had problems, such as the use of multiple letters or non-alphabetic characters to represent a single sound and the failure to make certain important distinctions. For the purposes of the TTS synthesis system of the present invention, the phonetic symbols set needed to be easy to process computationally, as well as easy for the voice talent to learn quickly and record the phrases accurately.

Therefore, all the phonetic symbols are single alphabetic characters and easy to process. One of the ramifications of having a syllable-in-context concatenative unit is that a fewer number of phonemes are required than in systems which base their concatenative unit on the phoneme or diphone. In embodiments of the TTS synthesis system of the present invention, only 39 phonemes are selected. For example, only one type of "t" phoneme is utilized since the varied linguistic context for "t" in words such as "tea" and "steep" will already be encoded as part of the syllable unit. Prosodic symbols such as the four levels of stress are diacritic. The stress levels that are represented are the unstressed, the primary stress, the phrasal stress, and the secondary stress.

In some embodiments, with the phonetic symbols set created, a recording list of phrases is produced. In at least one example of the present invention, 120,000 phrases were produced. In creating the phrase list, a special algorithm was utilized to encompass every possible English syllable within the smallest number of phrases. Once these phrases are recorded and analyzed into concatenative units, this expertly engineered phrase list enables the Applicant's TTS synthesis system to produce any English word because the phrase list includes every possible English syllable along with their linguistic context. Some examples of phrases and their phonetic transcriptions from the phrase list are the following:

---

CLARYVILLE COLLISION & CUSTOMS:
   kle'ri~|vI"l]kx~|lI'|Zx~n]a~nd]kx*|stx~mz}
CLAIBORNE AT ESPLANADE SS:
   kle'|bc"rn]a~t]E'|splx~|nA"d]E's]E*s}
CLAYLAND IGA FOODLINER:
   kle'|lx~nd]Y']Ji']e']fu*d|lY"|nR~}
CLAYPIT HILL ELEMENTARY SCHOOL:
   kle'|pI"t]hI'l]E"|lx~|mE*n|tx~ri~]sku'l}

---

Voice Recording

In embodiments of the present invention a voice talent uses a voice recording method to record all the phrases in the phrase list. In embodiments where the TTS synthesis system is utilized to a navigation system, the phrases are selected from a map data file which includes all of street names and point of interest (POI) names throughout the country. The Applicants have employed a greedy algorithm for selecting the phrases. The greedy algorithm is an algorithm that always takes the best immediate, or local, solution while finding an answer. Greedy algorithms find the overall, or globally, optimal solution for some optimization problems, but may find less-than-optimal solutions for some instances of other problems. If there is no greedy algorithm that always finds the optimal solution for a problem, a user may have to search (exponentially) many possible solutions to find the optimum. Greedy algorithms are usually quicker, since they don't consider the details of possible alternatives. In embodiments, the system may use a map data file such as one commercially available through a provider, for example, NAVTECH, Inc. of Monterey, Calif., USA.

The invention in embodiments can include a recording tool which displays each phrase one phrase at a time. As each phrase is recorded and saved, the recording tool automatically advances to the next phrase. The recording tool minimizes recording time and errors by automatically validating the amplitude of the recorded speech. In this way, each phrase is assured of having a consistent range in amplitude.

The recording tool also ensures that the recorded speech is not cut off at the beginning or at the end of the spoken phrase. That is, the voice talent is not allowed to advance to the next phrase if the voice talent starts to speak before turning on the toggle switch of the recording tool. In embodiments the tool also automatically places a minimum number of milliseconds of silence at both the start and end of the phrase so that the phrase can be more easily split into concatenative units at a later stage.

As stated in the phrase list section above, the voice talent must learn the phonetic symbols set in order to pronounce the phrases accurately. The recording tool displays the phonetic symbols legend for quick reference. Furthermore, in order to maximize the accuracy of reading the phrases, only the phonetic transcription is displayed on the recording tool screen. The English text is hidden from view in order to avoid having ambiguous phrases read incorrectly. For example, "record" is pronounced differently depending on whether it's construed as a noun or a verb. Abbreviations such as "St." and "Dr." are also ambiguous.

Once the recording session starts, a phrase to be recorded will appear in the lower panel of a split window. The pronunciation guide of this phrase appears underneath. To start recording, the voice talent can select the menu item Record|Begin, or click a button on the tool bar with the left button of your mouse, or simply press the Down Arrow on a keyboard. A red circle will appear in the upper panel indicating recording is in progress. When the voice talent finishes reading the phrase, she/he can select the menu item Record|End, or click a button on the tool bar with the left button of your mouse, or simply press the Down Arrow again on your keyboard. The waveform of the recording will appear in the upper panel.

The voice talent needs to read the phrase with a clear, steady and natural voice. If the voice is too loud or too weak, the voice talent will be prompted to read again. If the recording is good, the voice talent can move on to the next phrase by selecting the menu item Phrase|Next or clicking a button on the tool bar or simply pressing the Right Arrow on your keyboard. The recording will be automatically saved.

If it is necessary to hear a hint on the proper pronunciation of a phrase, the voice talent can select the menu item Phrase|TTS or click a button on the tool bar or simply press the Up Arrow on your keyboard. To browse recorded phrases, the voice talent can select the menu item Phrase|Previous or click a button on the tool bar or simply press the Left Arrow on your keyboard. The voice talent can select the menu item Phrase|Next or click a button on the tool bar or press the Right Arrow on your keyboard to return to the end of the recorded phrase list. To listen to a recorded phrase, the voice talent can select the menu item Record|Play or click the button on the tool bar.

Voice Analysis

Linguistic Algorithms

Embodiments of the present invention also include a method and apparatus for voice analysis. In at least one embodiment the Applicants have developed a voice analysis tool which provides an automatic syllable mark-up of all the recorded phrases. The voice analysis tool analyzes speech, one phrase at a time, by using complex linguistic algorithms to detect and mark the start and end of syllables and super-syllables which are the concatenative units. In order to create optimal mark-ups of the phrases, aside from using well known linguistic knowledge such as the second formant transition between consonants and vowels, the inventors have formulated the following algorithms for use within the voice analysis tool.

1. Unvoiced syllable-final regions in the speech waveforms of sonorants such as vowels, liquids, glides and nasals are omitted. Omitting such unvoiced regions saves storage space and provides for an optimal speech synthesis rate. (Phrase-final syllable endings are left intact.)

2. Any pauses in between the words of a phrase are omitted. This omission saves storage space.

3. Creakiness is omitted in order to create a smoother speech output. The unvoiced closure of stops are omitted in the mark-ups. At speech synthesis runtime, silent headers for the stops are manufactured. This omission during mark-up of the phrases also saves storage space.

4. The use of Reflection Coefficient calculations instead of Formant calculations to determine transitional boundaries between voiced and unvoiced regions. These are much easier to compute than Formants, while yielding more information. Accurately defining the onset and end of "true voicing" is crucial to the determination of syllable boundaries.

5. Accurate detection of: frication, pitch, RMS Energy, stop bursts, and silence.

6. Detecting a small but significant drop in voicing within a voiced region.

7. Detection of vowels within a long sequencing of voicing, including any minimal power regions separating them.

8. Finding a region of minimal power embedded within a larger region.

9. Nasal detection using Reflection Coefficient info as well as power stats.

10. The blotting out of low-energy transitional information between the end of a syllable and the start of the next one. This makes each syllable more sharable in other contexts.

The voice analysis tool also has a concatenation mode in which the marked-up syllables can be concatenated to demonstrate their accuracy. (1) A "Narrate" feature was instated into the tool which allows the consecutive concatenation of phrases instead of having them read out one by one. (2) During the Narrate mode, a feature that allows pressing a button to automatically place incorrect concatenations into a text file was installed. This saves time by not having to stop the concatenation process and manually write down the errors.

Instead of using the mouse to zoom in on certain parts of the phrase during mark-up, a zoom button was installed which allows zooming out several times for easy review of the intricate speech waveforms. A separate button allows zooming back in. Using zoom buttons instead of the mouse saves wear and tear on the wrist since thousands of phrases must be reviewed.

An example is a case where syllables in a phrase "Mirror-Light Place" are marked-up. In this example, the syllable corresponds to "Mirror" is a supersyllable noted above.

A voice waveform can be shown that is a combination of various frequency components (fundamental and harmonics) and their amplitudes that change depending on the tone, stress, and type of the voice, etc. A pitch plot shows changes of fundamental frequency. If the phrase is spoken by the same tone (frequency), the plot will be flat in a horizontal direction. If the plot goes higher, it means that the tone (frequency) of the recorded voice becomes higher. The reflection coefficients f2 and f3 help to find a boundary between two syllables. In this example, although the reflection coefficient f2 does not show any significant change between the syllables corresponding to "Mirror" and "Light", the reflection coefficient f3 shows a sharp change between the syllables, which signifies the syllable boundary.

In embodiments, the present invention is a method for recording verbal expressions of a person. The recorded verbal expressions can be used in a vehicle navigation system having a database, which includes a map and text describing street names and points of interest of the map.

Depending on the embodiment, generally the recorded expressions are of phrases which are constructed so that each phrase has a set of concatenative units which are different from any of the concatenative units used in the other phrases. The goal in operating the method is to minimize the number of phrases needed while including every concatenative unit set forth in the text of the words of the map database. In this manner the method may not have to include every syllable or concatenative unit of every word in the language that the system is utilizing, but instead, just has to include every syllable or concatenative unit of the only text contained in the database.

The final goal of the method is to have populated a database of voice recordings of each concatenative unit required for the particular database.

Figure 1:
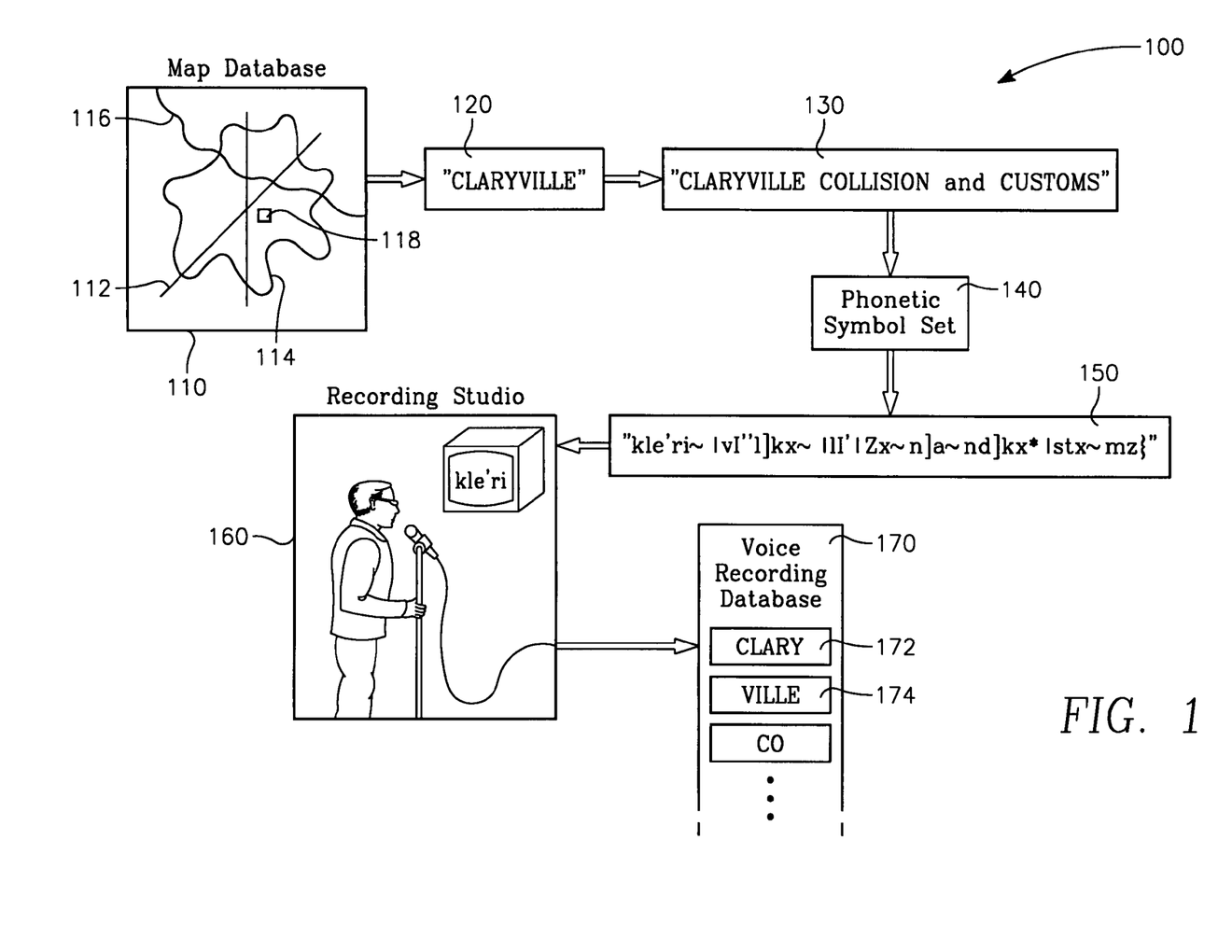
FIG. 1 shows a diagram of a method according to at least one embodiment of the present invention.

FIG. 1 shows a diagram of an embodiment of the method of the invention. The method 100 shown starts with a map database 110 which includes various map elements which may have text associated with them. As shown the database 110 includes map elements of a road 112, a geographic area 114 (e.g. a state or county), a river 116 and a city 118. Each of these elements can have a name indexed to the element in the map database 110. For example, the city 118 shown is named Claryville.

The method 100 can include a step of obtaining or extracting from the database text of a word 120, as shown the word 120 obtained, in the embodiment, is 'Claryville'. In this case the desire is to obtain a recording of each of the concatenative units in the word 'Claryville', namely 'clary' and 'ville'.

To aid the voice talent, to minimize the amount of time needed to record each concatenative unit, and to obtain a recording of the concatenative unit in a proper context, the word 120 is included in a phrase 130. The phrase 130 includes additional concatenative units which are not contained in the word 'Claryville'. As shown, the phrase 130 is 'Claryville Collision and Customs'.

Depending on the embodiment of the invention, any of a variety of methods can be used to construct the phrase and an entire set of phrases which set forth each concatenative unit just once (or at least a minimum number of times) while minimizing the total number of phrase in the set. As set forth above in detail, one such method is to employ a greedy algorithm.

Prior to having the voice talent read the phrase 130 the next step is to translate the text phrase 130 to a phonetic symbol phrase, as shown in the steps shown in 140 and 150. The text of the phrase 130 is run through a phonetic symbol set 140, which converts the phrase to the phonetic phrase 150. An example of a phonetic symbol set is shown below in Table A.

An example of a set of single alphabetic character phonetic symbols is shown in table A below:

TABLE A

| Description | Character | Example |
|---|---|---|
| vl lab asp | p | pee speed |
| vd lab stp | b | Be |
| vl alv stp | t | tea steep letter kitten |
| vd alv stp | d | Dee |
| vl vlr stp | k | key ski |
| vd vlr stp | g | McGee |
| vl alv aff | C | Cheap |
| vd alv aff | J | Jeep |
| vl lab frc | f | Fee |
| vd lab frc | v | Vee |

TABLE A-continued

| Description | Character | Example |
|---|---|---|
| vl dnt frc | Q | Theme |
| vd dnt frc | D | Thee |
| vl alv frc | s | Sea |
| vd alv frc | z | zee |
| vl plt frc | S | she |
| vd plt frc | Z | Asia |
| vl glt frc | h | he |
| vd lab nsl | m | me |
| vd alv nsl | n | nee |
| vd vlr nsl | G | ping |
| vd alv rtr | r | read |
| vd alv lat | l | lee |
| vd plt apr | y | yee |
| vd lab apr | w | we |
| fr hi ur ts | i | eat |
| fr hi ur lx | I | hit it |
| fr md ur ts | e | ate |
| fr md ur lx | E | Ed |
| fr lo ur lx | a | at |
| bk lo ur lx | A | odd |
| bk md rd ts | o | oat |
| bk md rd lx | c | ought |
| bk md ur lx | x | hut but |
| bk hi rd ts | u | food |
| bk hi rd lx | U | foot |
| bf lo to hi | Y | hide |
| bf md to hi | O | voit |
| bk lo to hi | W | out |
| bk md rtr | R | hurt butter |
| prim strs | ' | |
| scnd strs | ,, | |
| phrs strs | * | |
| no strs | ~ | |
| syll bndry | \| | |
| word bndry | ] | |
| phrs bndry | } | |

A glossary of the description terms in Table A are provided below in Table B:

TABLE B

| | |
|---|---|
| aff | affricate |
| alv | alveolar |
| apr | approximant |
| asp | aspirated |
| bk | back |
| bndry | boundary |
| dnt | dental |
| flp | flap |
| fr | front |
| frc | fricative |
| glt | glottal |
| hi | high |
| lab | labial |
| lat | lateral |
| lo | low |
| lx | lax |
| md | mid |
| nsl | nasal |
| phrs | phrase |
| plt | palatal |
| prim | primary |
| rd | round |
| rtr | retroflex |
| scnd | secondary |
| stp | stop |
| strs | stress |
| syl | syllabic |
| syll | syllable |
| ts | tense |
| ur | unrounded |
| vd | voiced |
| vl | voiceless |
| vlr | vela |

With the original phrase converted to a phonetic symbol phrase 150, the next step is to have the phrase 150 displayed and recorded by the voice talent. As shown in the recording studio 160 a display is set to show the phonetic symbol phrase to the voice talent who then can speak the phrase (make a verbal expression of the phrase).

As the voice talent is speaking the phrase, the phrase is recorded. The recording is then broken up into each concatenative unit by a voice analysis process. Embodiments of such a voice analysis processes are set forth above in detail. With the recording of the phrase broken down into separate recordings of the concatenative units, each of these concatenative units can be indexed and stored into a voice recording database 170. As shown, the database 170 includes separate recording of the concatenative units 'clary' 172 and 'ville' 174.

Having a voice recording database populated with a set of concatenative units, allows for later speech synthesis by retrieving and combining the recordings of concatenative units to form desired word and phrases. By have a voice recording database containing just the necessary concatenative units for the map database, and considering that each concatenative unit can potentially be used to form many different words during the speech synthesis, embodiments of the present invention provide a robust solution at a minimum of needed storage space and processor operation.

FIG. 2 sets for an embodiment of the method of the present invention. As shown, the method 200 includes the steps of obtaining from the database text of a word having at least one syllable 210, analyzing the at least one syllable with a greedy algorithm to construct at least one text phrase comprising each syllable of the at least one syllable, such that the number of phrases is at least substantially minimized 220, converting the at least one text phrase to at least one corresponding phonetic symbol phrase 230, displaying to the person the at least one phonetic symbol phrase 240, the person verbally expressing each phrase of the at least one phonetic symbol phrase 250, and recording the verbal expression of each phrase of the at least one phonetic symbol phrase 260.

Figure 2A:
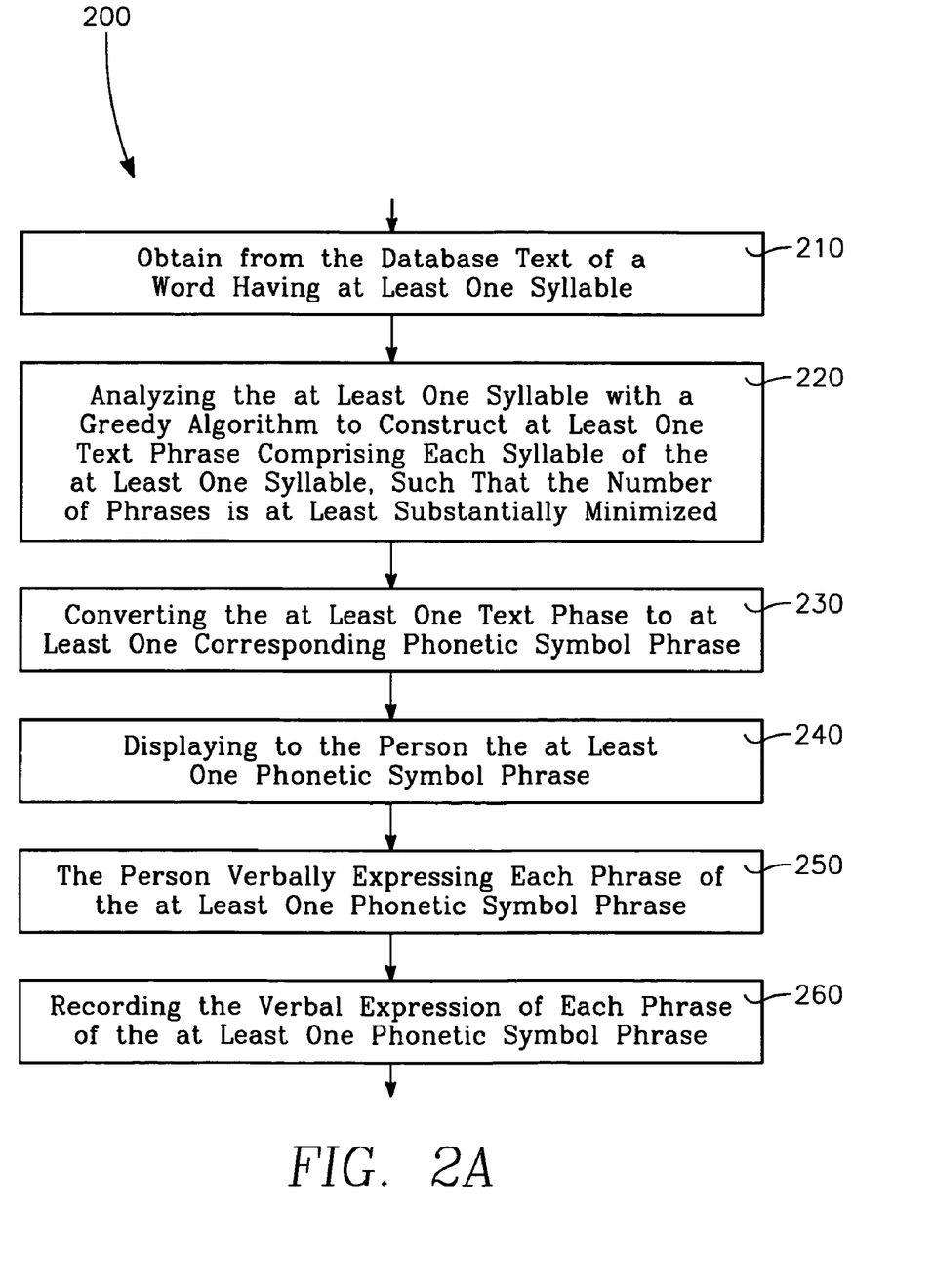
FIGS. 2A-D show flow charts according to at least one embodiment of the present invention.
Figure 2B:
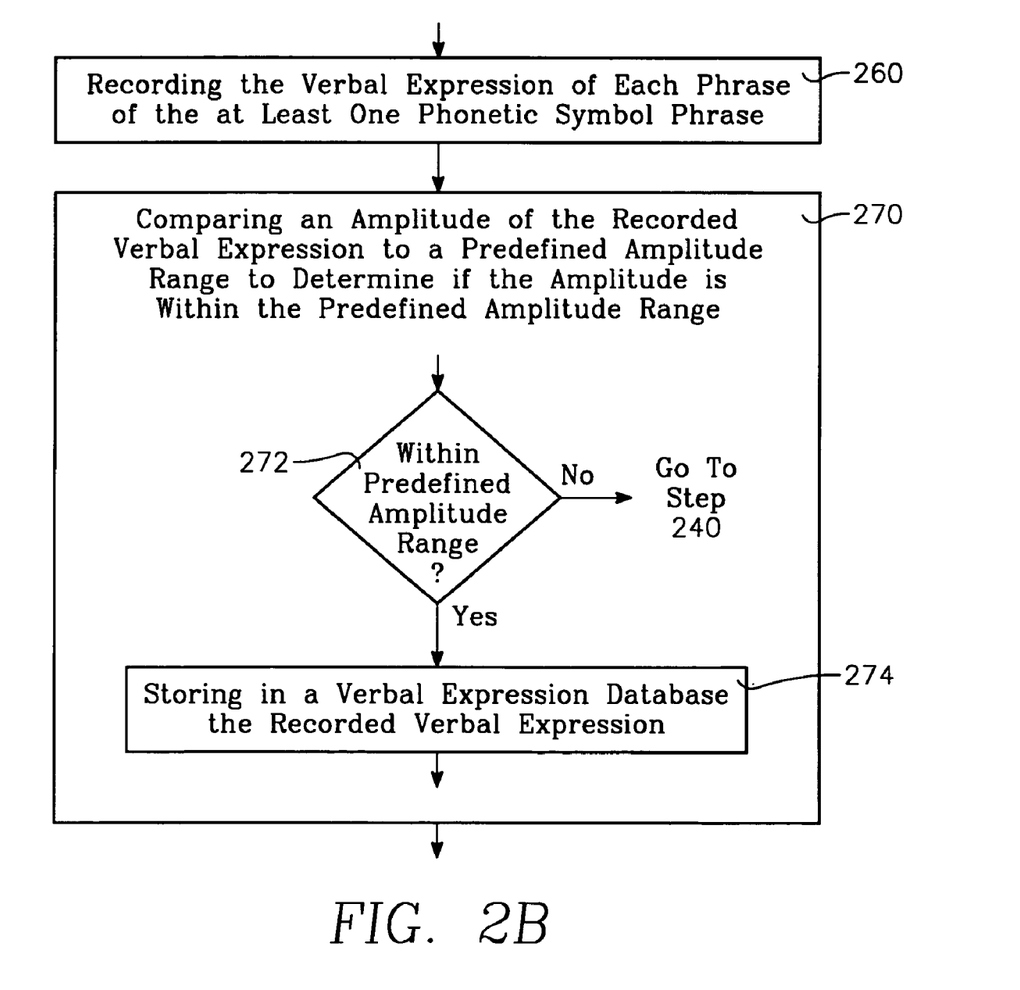

FIG. 2B sets forth an embodiment with an addition step in the method 200. The additional step is comparing an amplitude of the recorded verbal expression to a predefined amplitude range to determine if the amplitude is within the predefined amplitude range 270. This step can include a determination of whether the amplitude of the recorded verbal expression is within a predefined amplitude range 272. If the amplitude is within the predefined range, then the next step is storing in a verbal expression database the recorded verbal expression 274. If the amplitude is not within the predefined range, then the next step is to return to the step of displaying to the person the at least one phonetic symbol phrase 240 of the method 200 and then to the steps of the person verbally expressing each phrase 250, and recording the verbal expression of each phrase 260. This can be repeated until the verbal expression is recorded within the proper amplitude.

Figure 2C:
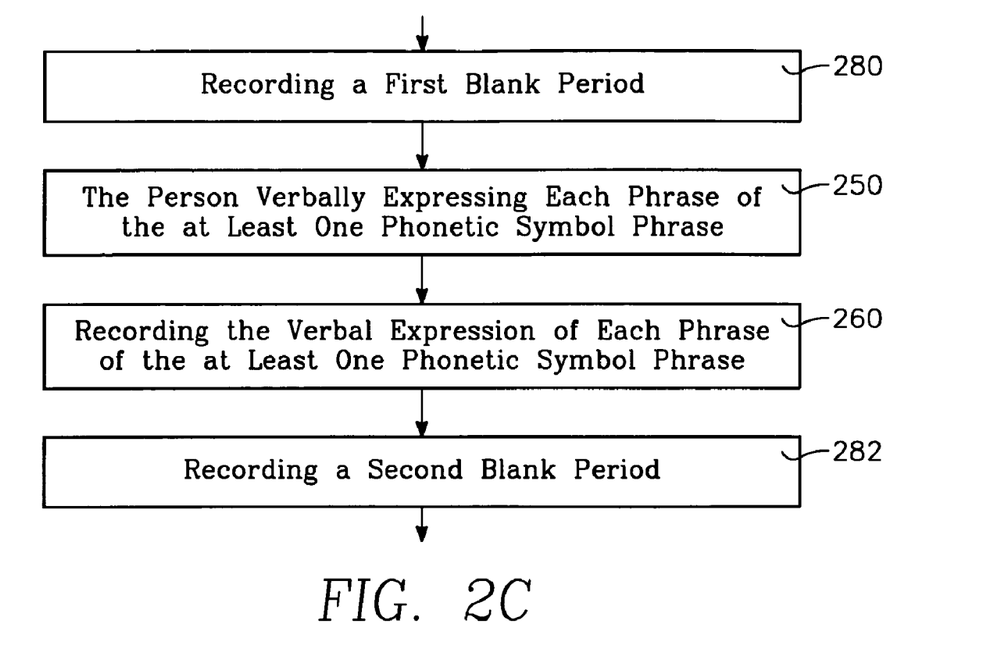

As shown in FIG. 2C, the method 200 can further include the step of recording a first blank period 280, which is positioned immediately before the steps of verbal expression 250 and the recording of the verbal expression 260. Also, the method 200 can include the step of recording a second blank period 282, which is positioned immediately after the steps of verbal expression 250 and the recording of the verbal expression 260. The addition of these steps leaves blanks before and after the recording, making the later mark-up and separation of the concatenative units easier.

Figure 2D:
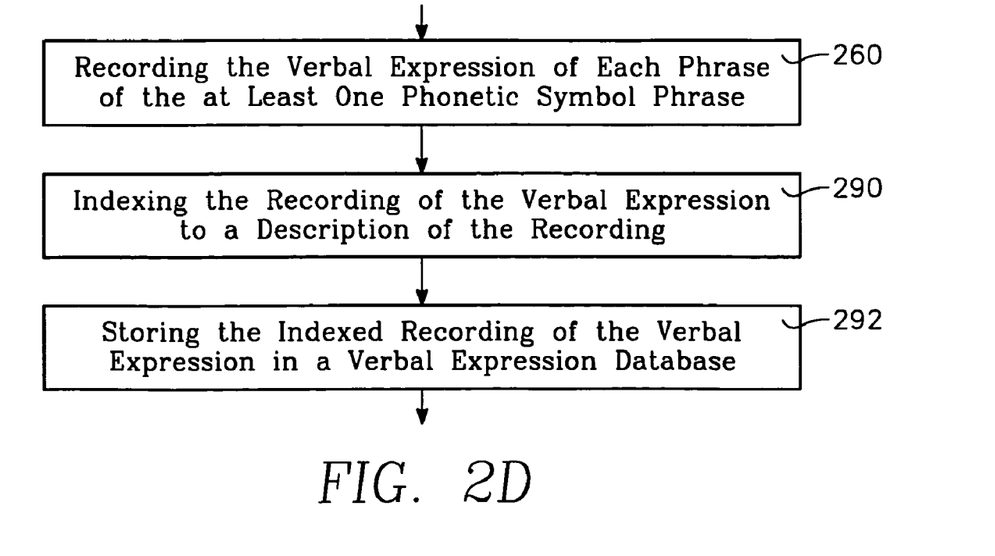

FIG. 2D shows an embodiment of the invention where the additional steps of indexing the recording of the verbal expression to a description of the recording 290 and storing the indexed recording of the verbal expression in a verbal expression database 292 have been added after the last step of the method 200. Indexing and storing the index verbal expression allows for easier later retrieval of the verbal expression from the database for analysis and or speech synthesis.

Although this invention has been disclosed in the context of certain embodiments and examples, it will be understood by those or ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Furthermore, the processes described herein may be embodied in hardware, in a set of program instructions-software, or both, i.e., firmware. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method for recording verbal expressions of a person implemented in a concatenative speech synthesis system, the method comprising the following steps of:
   designing a system with syllable-in-context constructs where all syllables of a language are represented, and if a syllable is bounded by vowel on either side, a phonetic context of the vowel is encoded;
   creating a database of text phrases in which each text phrase is represented as a sequence of syllable-in-context constructs;
   using a proprietary method to sort all of the text phrases based on numbers of new syllable-in-context constructs that each of the text phrases contains;
   displaying selected phrases one at a time through a proprietary speech recording software program for a voice talent in order to produce speech data of the selected phrases; and
   recording the verbal expression one text phrase at a time while checking a speech signal to be within a predetermined normal range so that it is not clipped or distorted at either side;
   wherein the syllable includes a regular syllable having exactly one vowel preceded and/or followed by any number of consonants, and a super-syllable having two or more syllables with a vowel hiatus across a syllable boundary.

2. The method for recording verbal expressions of claim 1, wherein the verbal expression describes at least one street name and one point of interest.

3. The method for recording verbal expressions of claim 1, further comprises a step of comparing an amplitude of the recorded verbal expression to a predefined amplitude range to determine if the amplitude is within the predefined amplitude range.

4. The method for recording verbal expressions of claim 3, wherein when the amplitude of the recorded verbal expression is within the predefined amplitude range, then the method further comprises a step of storing in a verbal expression database the recorded verbal expression.

5. The method for recording verbal expressions of claim 3, wherein when the amplitude of the recorded verbal expression is outside of the predefined amplitude range, then the method further comprises the following steps of:
   displaying to the person the at least one phonetic symbol phrase;
   the person verbally expressing each phrase of the at least one phonetic symbol phrase; and
   recording the verbal expression of each phrase of the at least one phonetic symbol phrase.

6. The method for recording verbal expressions of claim 1, further comprises a step of recording a first blank period, wherein the first blank period is substantially silent.

7. The method for recording verbal expressions of claim 6, further comprises a step of recording a second blank period, wherein the second blank period is substantially silent.

8. The method for recording verbal expressions of claim 7, wherein a length of each of the first blank period and the second blank period is at least one millisecond.

9. The method for recording verbal expressions of claim 7, wherein the step of recording the first blank period occurs prior to the step of recording the verbal expression of each phrase of the at least one phonetic symbol phrase and the step of recording the second blank period occurs after the step of recording the verbal expression of each phrase of the at least one phonetic symbol phrase.

10. The method for recording verbal expressions of claim 1, further comprises a step of indexing the recording of the verbal expression to a description of the recording and storing the indexed recording of the verbal expression in a verbal expression database.

11. The method for recording verbal expressions of claim 10, wherein the description of the recording comprises the text of each phrase of the verbal expression.

12. The method for recording verbal expressions of claim 11, wherein the description of the recording comprises phonetic symbols of each phrase of the verbal expression.

13. A method for recording verbal expressions of a person implemented in a concatenative speech synthesis system for use in a vehicle navigation system having a database including a map and text describing street names and points of interest of the map, the method comprising the following steps of:
   designing a system with syllable-in-context constructs where all syllables of a language are represented, and if a syllable is bounded by vowel on either side, a phonetic context of the vowel is encoded;
   creating a database of text phrases in which each text phrase is represented as a sequence of syllable-in-context constructs;
   using a proprietary method to sort all of the text phrases based on numbers of new syllable-in-context constructs that each of the text phrases contains;
   displaying selected phrases one at a time through a proprietary speech recording software program for a voice talent in order to produce speech data of the selected phrases; and
   recording the verbal expression one text phrase at a time while checking a speech signal to be within a predetermined normal range so that it is not clipped or distorted at either side;
   wherein the syllable includes a regular syllable having exactly one vowel preceded and/or followed by any number of consonants, and a super-syllable having two or more syllables with a vowel hiatus across a syllable boundary.

14. The method for recording verbal expressions of claim 13, further comprises a step of comparing an amplitude of the recorded verbal expression of each phrase to a predefined amplitude range to determine if the amplitude is within the predefined amplitude range.

15. The method for recording verbal expressions of claim 14, wherein when the amplitude of the recorded verbal expression of each phrase is within the predefined amplitude range, then the method further comprises a step of storing in a verbal expression database the recorded verbal expression of each phrase.

16. The method for recording verbal expressions of claim 13, further comprises a step of indexing the recording of the verbal expression of each phrase to a description of the recording and storing the indexed recording of the verbal expression of each phrase in a verbal expression database.

* * * * *